(12) United States Patent  (10) Patent No.: US 6,794,782 B2
Mahfoudh et al.  (45) Date of Patent: Sep. 21, 2004

(54) SHACKLE SPRING

(75) Inventors: Samir Mahfoudh, Buehl (DE);
Guillaume Martel, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 129 days.

(21) Appl. No.: 10/221,288

(22) PCT Filed: Jun. 25, 2001

(86) PCT No.: PCT/DE01/02290

§ 371 (c)(1),
(2), (4) Date: Sep. 9, 2002

(87) PCT Pub. No.: WO02/01699

PCT Pub. Date: Jan. 3, 2002

(65) Prior Publication Data

US 2003/0020350 A1 Jan. 30, 2003

(30) Foreign Application Priority Data

Jun. 27, 2000 (DE) .......................... 100 31 254

(51) Int. Cl.[7] .............................................. H02K 21/26
(52) U.S. Cl. ........................ 310/154.03; 310/154.14; 310/154.15
(58) Field of Search ................. 310/154.03, 154.08, 310/154.13, 154.14, 154.15

(56) References Cited

U.S. PATENT DOCUMENTS

| 3,258,622 | A | * | 6/1966 | Gillespie | 310/154.14 |
| 4,412,145 | A | | 10/1983 | Voss | |
| 4,445,060 | A | * | 4/1984 | Ruhle et al. | 310/154.14 |
| 4,587,449 | A | * | 5/1986 | West | 310/154.27 |
| 4,636,107 | A | * | 1/1987 | Casler et al. | 411/477 |
| 4,668,887 | A | * | 5/1987 | D'Argouges et al. | 310/154.14 |
| 5,391,063 | A | | 2/1995 | Hantle | |
| 5,959,386 | A | | 9/1999 | Knight | |

FOREIGN PATENT DOCUMENTS

| DE | 195 01 750 A | | 7/1996 | |
| JP | 06169538 | * | 6/1994 | H02K/1/17 |

* cited by examiner

Primary Examiner—Thanh Lam
(74) Attorney, Agent, or Firm—Michael J. Striker

(57) ABSTRACT

A fastening spring for fastening at least one component accommodated in a housing of an electric motor, in the prior art, has a bending zone which is exposed to strong mechanical stresses.

A fastening spring (1, 1') of the invention has at least a second bending zone, so that the mechanical stresses are distributed over two bending zones.

10 Claims, 2 Drawing Sheets

SHACKLE SPRING

This application is a 371 of PCT/DE 01/02290 filed Jun. 25, 2001.

BACKGROUND OF THE INVENTION

The invention is based on a fastening spring for fastening at least one component, accommodated in a housing of an electric motor.

From U.S. Pat. 5,391,063, a fastening spring is known which is U-shaped and which fastens two magnets in a motor housing of an electric motor. However, the fastening spring has only one bending zone. A high degree of mechanical stress on the fastening spring in the bending zone leads to a considerable concentration of mechanical stress and rapid breakage of the spring.

In a fastening spring of the prior art, one is therefore forced to use spring steel as the material. Since spring steel is magnetically conductive, relevant magnetic flux losses occur. This leads to a loss of efficiency of the motor or to an increase in the installation space of the motor and makes the component more expensive.

SUMMARY OF THE INVENTION

The fastening spring of the invention has the advantage over the prior art that in a simple way, the mechanical stress on the fastening spring is reduced sharply and the spring force is increased.

The low resultant stress level on the fastening spring of the invention allows the use of either a less expensive material or a weakly magnetic special steel. The use of weakly magnetic special steel assures better efficiency of the motor.

The fastening spring of the invention makes it possible, at a relatively slight degree of stress on the material, to generate a restoring force. Moreover, because of the shape of the fastening spring, the tendency of a fastening spring of the prior art to snap off is overcome.

By the provisions recited in the dependent claims, advantageous refinements of and improvements to the fastening spring recited in claim 1 are possible.

It is advantageous that a first and/or second leg of a U shape rests at least in part on components, since as a result the spring force of the fastening spring engages the components optimally.

It is advantageous for a width of the fastening spring to be made less than a spacing between two opposed V-shaped segments, because this prevents fastening springs from catching on one another.

BRIEF DESCRIPTION OF THE DRAWINGS

Exemplary embodiments of the invention are shown in simplified form in the drawing and described in further detail in the ensuing description.

Shown are

DESCRIPTION OF THE EXEMPLARY EMBODIMENTS

Figure 1:
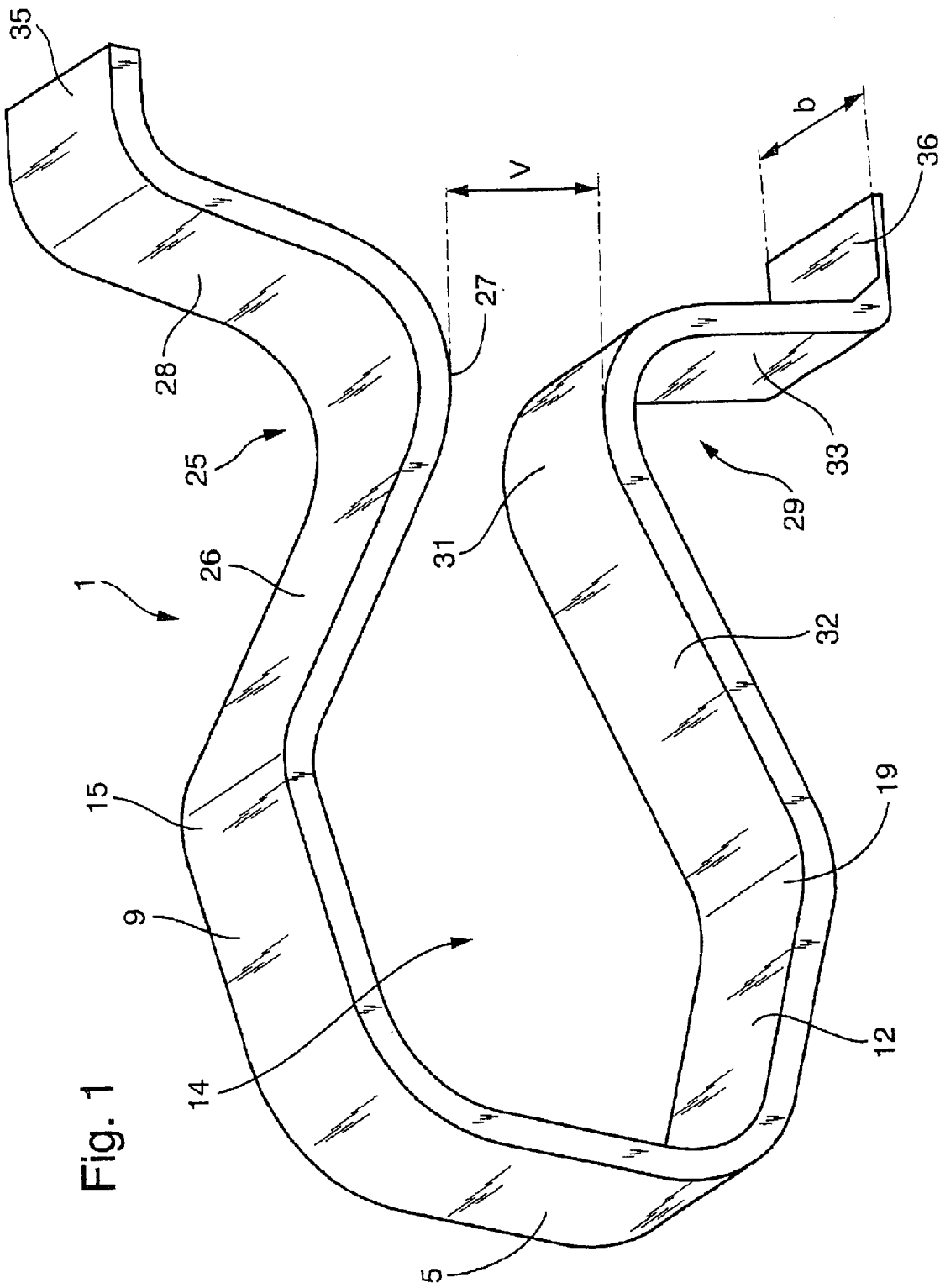
FIG. 1, a fastening spring of the invention in the undeformed state.

FIG. 1 shows a fastening spring 1 of the invention in the undeformed state.

DETAILED DESCRIPTION OF THE PREFERRED EMBODIMENTS

The fastening spring 1 has a U-shaped bottom. The U-shaped bottom is adjoined in both directions by a first leg 9 and a second leg 12, respectively. The U-shaped bottom 5 and the legs 9, 12 form a U shape 14.

One end 15 of the first leg 9 is adjoined by a first V shape 25, which is formed of two legs 26, 28 that have a common point 27 where the legs intersect. The two legs 26, 28 of the V shape 25 open outward. One end 19 of the second leg 12 is adjoined for instance by a second V shape 29 with a point 31 where the legs intersect. The second V shape 29 also has two legs 32, 33 and is opened toward the outside. The first V shape 25 and the second V shape 29 are located opposite one another, for instance, while the leg intersection points 27, 31 have a spacing v from one another.

The fastening spring 1 is bent out of band material, for instance, with a rectangular cross section, which has a width b. To prevent loose fastening springs 1 in a supply container from catching on one another, it is appropriate for the spacing v to be greater than the width b of the fastening spring 1.

Figure 2:
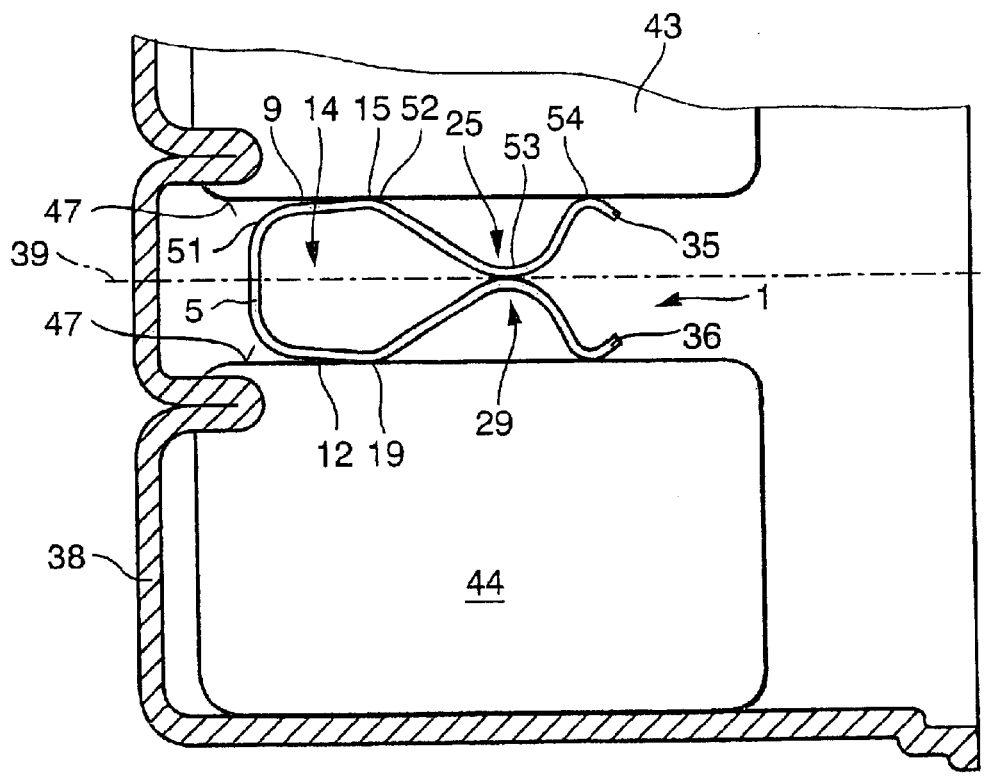
FIG. 2, a fastening spring of the invention in the installed state in a housing between two components.

FIG. 2 shows the fastening spring 1 in the installed state. The fastening spring 1 is installed in a housing 38 of an electric motor, where it fastens a first component 43 and a second component 44 to the housing 38 by restraint. In this exemplary embodiment, the components are magnets 43, 44 in the housing 38 of a stator. As components to be fastened in a housing 38 of an electric motor, magnetic short-circuit elements can for instance also be considered.

The housing 38 has a center line 39.

The magnets 43, 44 are adapted for instance to an internal shape of the housing 38, and inside the housing 38 they rest at least in part directly on an inner wall of the housing 38. In this exemplary embodiment, one fastening spring 1 each is located between the magnets 43, 44. The magnets 43, 44 have end faces 47. The fastening spring 1 engages the end faces 47 of the magnets 43, 44. Each magnet 43, 44 is pressed firmly against the housing 38 by the spring force of two fastening springs 1.

Instead of the second fastening spring 1, there can for instance also be a protrusion from the inner wall of the housing 38, on which protrusion the end faces 47 of the two magnets 43, 44 rest. For fastening the magnets 43, 44 in the housing 38, one fastening spring 1 then suffices, which is located between the two other end faces 47 of the magnets 43, 44.

If only one component needs to be fastened in a housing 38, then for the fastening spring 1 there must be a second protrusion from the inner wall of the housing 38, on which protrusion the fastening spring can be braced.

The fastening spring 1 has a first region 51, at the transition between the bottom 5 of the U and the legs 9, 12; a second region 52 on the ends 15, 19 of the legs; a third region 53 at the points 27, 31 where the legs intersect; and a fourth region 54 at the transition between the legs 28, 33 and end segments 35, 36. The regions 52 and 54 of the fastening spring 1 are compressed upon installation, resulting in a mechanical stress on the regions 51, 52 and 53. When the region 53 of the fastening spring 1 closes, that is, when the two V shapes 25 and 29 touch, the second stage of the spring characteristic curve comes into play, in which the first V shape 25 and the second V shape 29 become bent.

The spring force is distributed over a plurality of regions, resulting in a reduction in stress compared to a fastening spring of the prior art.

The symmetrical design and the two insertion chamfers in the region 51 serve to provide simple, unproblematic automatic mounting in the housing 38.

Figure 3:
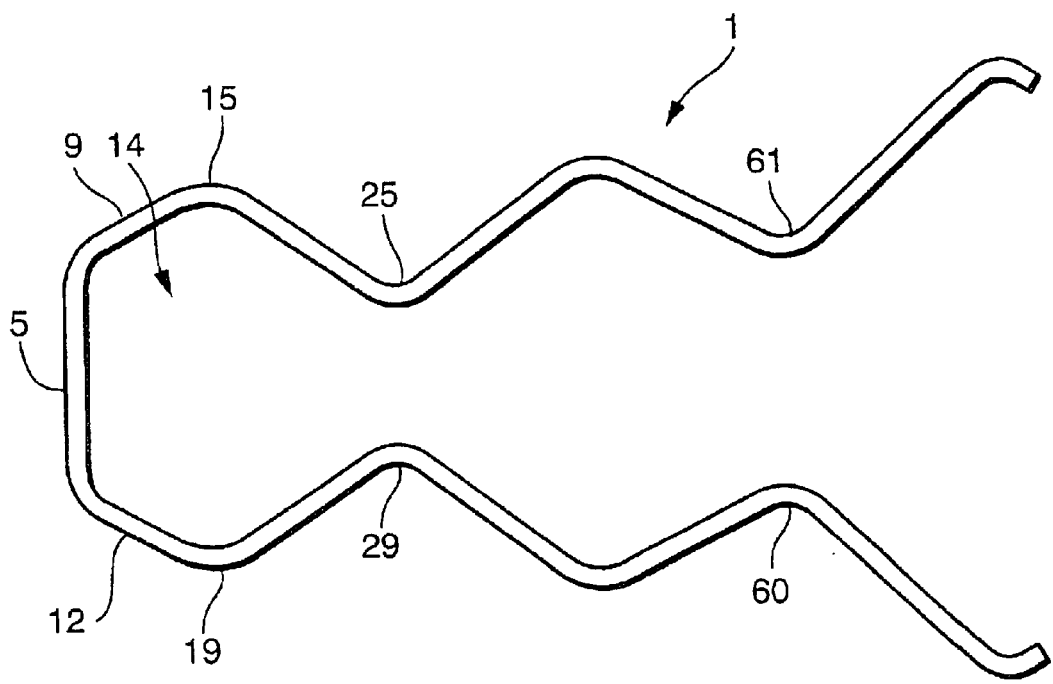
FIG. 3, a further fastening spring of the invention.

FIG. 3 shows a further exemplary embodiment of the fastening spring 1' of the invention.

The fastening spring 1' is created by means of a refinement of the fastening spring 1 of FIG. 1, such that the two V shapes 25, 29 are each adjoined by a respective third v shape 60 and fourth V shape 61.

What is claimed is:

1. A fastening spring for fastening at least two components in the form of magnets, accommodated in a housing of an electric motor, comprising:
   a first U-shaped segment, wherein said first U-shaped segment has a first leg, a second leg, and a bottom of the U, and at least one V-shaped segment, wherein said at least one V-shaped segment adjoins one of the first and second legs and opens outwardly.

2. The fastening spring of claim 1, wherein the first leg and/or the second legs rests at least in part flatly on the components.

3. The fastening spring of claim 1, wherein at least two V-shaped segments are located opposite on another.

4. The fastening spring of claim 1, wherein a width (b) of the fastening spring (1, 1') is less than a spacing (v) between two opposed V-shaped segments.

5. The fastening spring of claim 1, wherein for the fastening spring (1, 1'), weakly magnetic special steel is used.

6. The fastening spring of claim 1, wherein the at least one V-shaped segment comprises first and second legs having a common point where the first and second legs intersect.

7. The fastening spring of claim 6, wherein the first and second legs open outwardly.

8. The fastening spring of claim 1, wherein the first and second legs each have a V-shaped segment, wherein the V-shaped segments are located opposite to one another.

9. The fastening spring of claim 8, wherein the V-shaped segments have a spacing from one another.

10. The fastening spring of claim 8, wherein the V-shaped segments contact one another after installation into the housing.

* * * * *